(12) United States Patent
Stierli

(10) Patent No.: US 8,224,967 B2
(45) Date of Patent: Jul. 17, 2012

(54) METHODS AND SYSTEMS FOR PROVIDING AN APPLICATION FROM AN APPLICATION PROVIDING SYSTEM TO A FIRST FRONT-END SYSTEM AND A SECOND FRONT-END SYSTEM

(75) Inventor: Markus Stierli, Tokyo (JP)

(73) Assignee: SAP AG, Walldorf (DE)

( * ) Notice: Subject to any disclaimer, the term of this patent is extended or adjusted under 35 U.S.C. 154(b) by 2275 days.

(21) Appl. No.: 10/947,149

(22) Filed: Sep. 23, 2004

(65) Prior Publication Data

US 2006/0080652 A1 Apr. 13, 2006

(51) Int. Cl.
*G06F 15/16* (2006.01)
(52) U.S. Cl. ......... 709/227; 709/221; 709/222; 709/223
(58) Field of Classification Search .................. 709/221, 709/222, 223, 227
See application file for complete search history.

(56) References Cited

U.S. PATENT DOCUMENTS

| | | | |
|---|---|---|---|
| 6,513,153 B1 * | 1/2003 | Lee | 717/100 |
| 2002/0010807 A1 * | 1/2002 | Multer et al. | 709/328 |
| 2003/0105812 A1 * | 6/2003 | Flowers et al. | 709/203 |
| 2003/0154264 A1 * | 8/2003 | Martin et al. | 709/221 |
| 2006/0028998 A1 * | 2/2006 | Lioy et al. | 370/252 |

* cited by examiner

*Primary Examiner* — Adnan Mirza
(74) *Attorney, Agent, or Firm* — Finnegan, Henderson, Farabow, Garrett & Dunner, LLP

(57) ABSTRACT

Systems and methods are disclosed for providing an application. The systems and methods may include receiving a first selection data from a first front-end system or a first back-end system and receiving a second selection data from a second front-end system and a second back-end system. The systems and methods may next include transmitting a first version of a first service module to the first front-end system and transmitting a second version of the first service module to the second front-end system. In addition, the systems and methods may include receiving a first output data and a second output data from the first front-end system and from the second front-end system respectively, the first output data being produced by the first version of the first service module executed on the first front-end system and the second output data being produced by the second version of the first service module executed on the second front-end system.

18 Claims, 3 Drawing Sheets

METHODS AND SYSTEMS FOR PROVIDING AN APPLICATION FROM AN APPLICATION PROVIDING SYSTEM TO A FIRST FRONT-END SYSTEM AND A SECOND FRONT-END SYSTEM

BACKGROUND OF THE INVENTION

I. Field of the Invention

The present invention generally relates to providing an application. More particularly, the present invention relates to methods and systems for providing an application from an application providing system to a first front-end system and a second front-end system.

II. Background Information

The use of wireless products and systems in the day-to-day lives of most people is continually growing. With the advent and steady growth of wireless telecommunications, wireless telecommunication systems will increasingly be utilized for not only voice, but also for sending and receiving packetized data, for example. In an effort to lower operating costs and increase value for its subscribers, enterprises, such as wireless telecommunication providers or other service providers, wish to provide applications to user devices in a telecommunication system. Enterprises providing such applications may realize a competitive advantage by creating new value added services that may, for example, attract new subscribers or that may tend to retain current subscribers.

Enterprises may wish to provide software applications to wireless devices such as PDAs, laptop computers, or smart phones to employees of the enterprise, for example. One way to provide software applications to wireless devices is for an enterprise to design and build a dedicated system to carry out this function. However, such dedicated systems are expensive and the cost may not be justified for applications that are not critical to the enterprise's mission, for example.

In view of the foregoing, there is presently a need for an improved system and method for providing an application to user devices. Further, there is a need for a system and method for providing an application to user devices over a wireless network, such as a wireless telecommunication system, for example.

SUMMARY OF THE INVENTION

Consistent with embodiments of the present invention, systems and methods are disclosed for efficiently providing an application from an application providing system to a first front-end system and a second front-end system.

In accordance with one embodiment, a method for providing an application from an application providing system to a first front-end system and a second front-end system comprises receiving a first selection data from at least one of the first front-end system and a first back-end system, receiving a second selection data from at least one of the second front-end system and a second back-end system, transmitting, in response to the first selection data, a first version of a first service module to the first front-end system, the first version of the first service module being associated with the application, the application being selected from a plurality of applications based on the first selection data, transmitting, in response to the second selection data, a second version of the first service module to the second front-end system, the second version of the first service module being associated with the application, the application being selected from the plurality of applications based on the second selection data, and receiving a first output data and a second output data from the first front-end system and from the second front-end system respectively, the first output data being produced by the first version of the first service module executed on the first front-end system and the second output data being produced by the second version of the first service module executed on the second front-end system.

According to another embodiment, a system for providing an application to a first front-end system and a second front-end system comprises a memory storage for maintaining a plurality of data registers and a processing unit coupled to the memory storage, wherein the processing unit is operative to receive a first selection data from at least one of the first front-end system and a first back-end system, receive a second selection data from at least one of the second front-end system and a second back-end system, transmit, in response to the first selection data, a first version of a first service module to the first front-end system, the first version of the first service module being associated with the application, the application being selected from a plurality of applications based on the first selection data, transmit, in response to the second selection data, a second version of the first service module to the second front-end system, the second version of the first service module being associated with the application, the application being selected from the plurality of applications based on the second selection data, and receive a first output data and a second output data from the first front-end system and from the second front-end system respectively, the first output data being produced by the first version of the first service module executed on the first front-end system and the second output data being produced by the second version of the first service module executed on the second front-end system.

In accordance with yet another embodiment, a computer-readable medium which stores a set of instructions which when executed performs a method for providing an application from an application providing system to a first front-end system and a second front-end system, the method executed by the set of instructions comprises receiving a first selection data from at least one of the first front-end system and a first back-end system, receiving a second selection data from at least one of the second front-end system and a second back-end system, transmitting, in response to the first selection data, a first version of a first service module to the first front-end system, the first version of the first service module being associated with the application, the application being selected from a plurality of applications based on the first selection data, transmitting, in response to the second selection data, a second version of the first service module to the second front-end system, the second version of the first service module being associated with the application, the application being selected from the plurality of applications based on the second selection data, and receiving a first output data and a second output data from the first front-end system and from the second front-end system respectively, the first output data being produced by the first version of the first service module executed on the first front-end system and the second output data being produced by the second version of the first service module executed on the second front-end system.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

Figure 1:
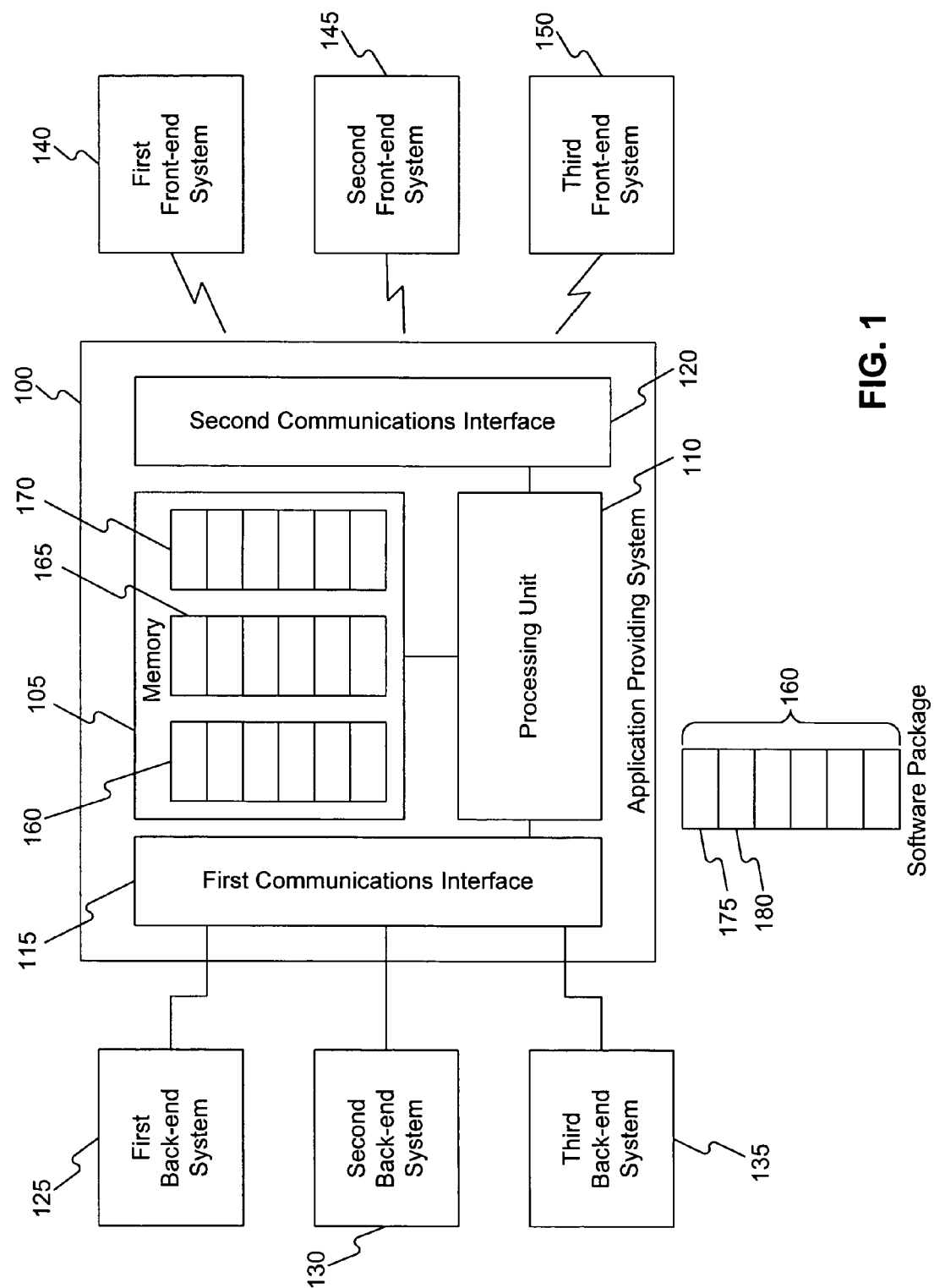
FIG. 1 is a block diagram of an exemplary application providing system consistent with the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding steps to the disclosed methods. Accordingly, the following detailed description does not limit the invention. Instead, the proper scope of the invention is defined by the appended claims.

User enterprises, such as businesses, wish to provide software applications over wireless devices such as PDAs, laptop computers, or smart phones to individuals associated with the user enterprises, such as employees, for example. These applications, for example, may include e-mail, scheduling, inventory, and order processing. In order to provide such applications, a wireless service provider or other entity, alone or in conjunction with a wireless service provider, may provide an application providing system located at a wireless service provider or other location. An operator of the application providing system may connect back-end equipment from different user enterprises to the application providing system. Also, the application providing system operator may connect to the application providing system, through the wireless service provider, various wireless devices associated with the user enterprises.

The application providing system may contain several applications available to the user enterprises. Wireless devices associated with a particular user enterprise may download a module associated with a selected application from the application providing system, run the module, and transfer data processed by the module back to the application providing system. Once on the application providing system, a second module associated with the application may operate on the received data. The application providing system may then transfer data to the back-end system associated with the wireless device's user enterprise. Multiple user enterprises can run the same or similar application and yet the data associated with one user enterprise can be completely withheld from other user enterprises running the same application in conjunction with the application providing system. Furthermore, the wireless service provider may provide billing for any service provided to the user enterprise associated with the selected application.

A system for providing an application to a first front-end system and a second front-end system may comprise a memory storage for maintaining a plurality of data registers. The system may further include a processing unit coupled to the memory storage operative to receive a first selection data from at least one of the first front-end system and a first back-end system and to receive a second selection data from at least one of the second front-end system and a second back-end system. Moreover, the processing unit may be operative to transmit, in response to the first selection data, a first version of a first service module to the first front-end system, the first version of the first service module being associated with the application, the application being selected from a plurality of applications based on the first selection data. In addition, the processing unit may be operative to transmit, in response to the second selection data, a second version of the first service module to the second front-end system, the second version of the first service module being associated with the application, the application being selected from the plurality of applications based on the second selection data. Also, the processing unit may be operative to receive a first output data and a second output data from the first front-end system and from the second front-end system respectively, the first output data being produced by the first version of the first service module executed on the first front-end system and the second output data being produced by the second version of the first service module executed on the second front-end system.

Consistent with an embodiment of the present invention, the aforementioned memory and processing unit may be implemented in an application providing system, such as an application providing system 100 of FIG. 1. Any suitable combination of hardware, software and/or firmware may be used to implement the memory and processing unit. For example, system 100 may comprise a computer system 300 as described in FIG. 3 below. Furthermore, the memory and processing unit may be implemented with memory 105 and processing unit 110, in combination with system 100. The aforementioned system, memory, and processor are exemplary and other memories and processors may comprise system 100, consistent with embodiments of the present invention.

By way of a non-limiting example, FIG. 1 illustrates system 100 in which the features and principles of the present invention may be implemented. As illustrated in the block diagram of FIG. 1, system 100 may include memory 105, processing unit 110, a first communications interface 115, and a second communications interface 120. In the embodiment of FIG. 1, first communications interface 115 allows system 100 to communicate with a plurality of back-end systems comprising, for example, a first back-end system 125, a second back-end system 130, and a third back-end system 135. Similarly, second communications interface 120 allows system 100 to communicate with a plurality of front-end systems comprising, for example, a first front-end system 140, a second front-end system 145, and a third front-end system 150. Alternatively, system 100 may communicate with the plurality of front-end systems and the plurality of front-end systems using only one communications interface (not shown) that may be wired or wireless.

First communications interface 115 and second communications interface 120 may utilize, for example, a local area network (LAN) or a wide area network (WAN). Such networking environments are commonplace in offices, enterprise-wide computer networks, intranets, and the Internet. If a LAN is used, a network interface located at any of the front-end and back-end systems may be used to interconnect any of the front-end and back-end systems with system 100. If a WAN is used, such as the Internet, the front-end and back-end systems may typically include an internal or external modem (not shown) or other means for establishing communications over the WAN. Furthermore, data sent using first communications interface 115 and second front-end system 145 may be encrypted to insure data security by using known encryption/decryption techniques.

In addition to utilizing a wire line communications system, first communications interface 115 and second communications interface 120 may utilize wireless communications systems, or a combination of wire line and wireless may be utilized in order to, for example, exchange web pages via the Internet, exchange e-mails via the Internet, or for utilizing other communications channels. Wireless can be defined as radio transmission via the airwaves. However, it may be appreciated that various other communication techniques can be used to provide wireless transmission, including infrared line of sight, cellular, microwave, satellite, packet radio and spread spectrum radio.

System 100 may also transmit and receive data by methods and processes other than, or in combination with, first communications interface 115 and second communications interface 120. These methods and processes may include, but are not limited to, transferring data via, diskette, CD ROM, facsimile, conventional mail, an interactive voice response system (IVR), or via voice over a publicly switched telephone network.

Any system in the plurality of front-end systems or the plurality of back-end systems may be implemented using a personal computer, network computer, mainframe, or other similar microcomputer-based workstation. Any system in the plurality of front-end systems or the plurality of back-end systems may comprise any type of computer operating environment, such as hand-held devices, multiprocessor systems, microprocessor-based or programmable sender electronic devices, minicomputers, mainframe computers, and the like. Any of the systems may also be practiced in distributed computing environments where tasks are performed by remote processing devices. Furthermore, any of the systems may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, or a facsimile machine. The aforementioned are exemplary and any system in the plurality of front-end systems or the plurality of back-end systems may comprise other devices.

Memory 105 may contain several software packages, for example, a first software package 160, a second software package 165, and a third software package 170, each corresponding to a different available application. These applications may comprise but are not limited to e-mail, scheduling, inventory, and order processing, for example. Memory 105 may contain software packages corresponding to any application. Each software application may comprise a plurality of service modules. For example, first software package 160 may comprise a first service module 175 and a second service module 180. The service module may be executed on system 100, any of the back-end systems, any of the front-end systems, or any combination of the aforementioned systems. Furthermore, different versions of the service modules may be maintained in memory 105. The different versions of the service modules may carryout the same general function, but each may be customized for a particular user enterprise's needs.

System 100 may be located anywhere including at facilities operated by a wireless communications provider or any remote site. When system 100 is used in conjunction with a wireless service provider, billing for services provided by system 100 to any of the front-end systems or back-end systems may be performed by a wireless service provider. For example, if an application such as e-mail is provided to first front-end system, the fee associated with providing this application may be billed by the wireless service provider. In addition, the wireless service provider may transfer a portion or all of the fee collected to an operator of system 100.

Figure 2:
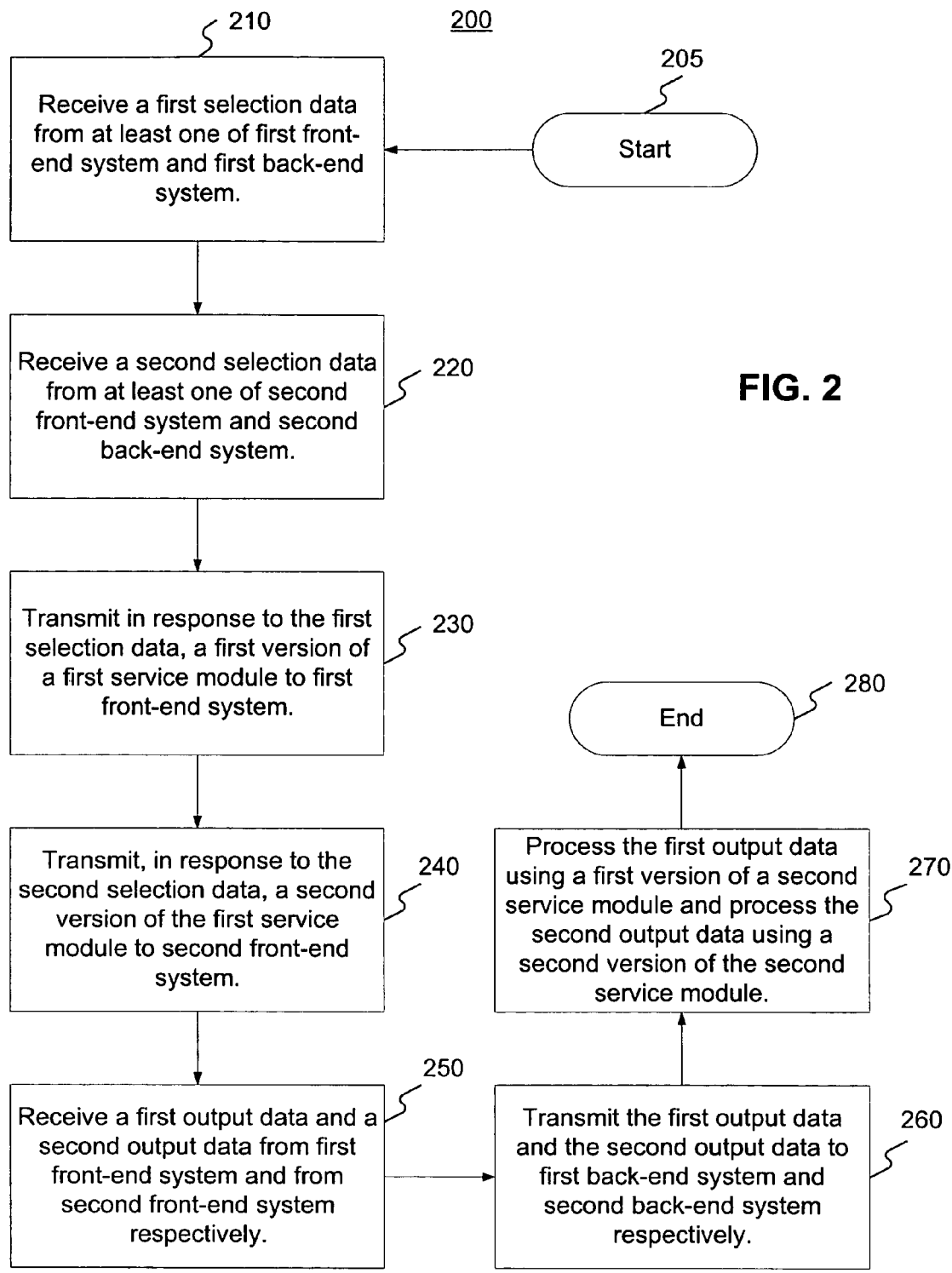
FIG. 2 is a flow chart of an exemplary method for providing an application from an application providing system to a first front-end system and a second front-end system consistent with the present invention.

FIG. 2 is a flow chart setting forth the general stages involved in exemplary method for providing an application from an application providing system to a first front-end system and a second front-end system consistent with the invention. Exemplary ways to implement the stages of method 200 will be described in greater detail below. Exemplary method 200 may begin at starting block 205 and proceed to stage 210 where system 100 may receive a first selection data from first front-end system 140 or first back-end system 125. For example, first front-end system 140 or first back-end system 125 may cause the first selection data to include information indicating a desire to perform e-mail, scheduling, inventory, and an order processing application. The aforementioned applications are exemplary and other applications may be used. First front-end system 140 may send the first selection data to system 100 through second communications interface 120 and first back-end system 125 may send the first selection data to system 100 through first communications interface 115.

From stage 210, where system 100 may receive the first selection data from first front-end system 140 or first back-end system 125, exemplary method 200 may continue to stage 220 where system 100 may receive a second selection data from second front-end system 145 or second back-end system 130. For example, second front-end system 145 or second back-end system 130 may cause the second selection data to include information indicating a desire to perform e-mail, scheduling, inventory, or an order processing application. The aforementioned application are exemplary and other application may be used. Second front-end system 145 may send the second selection data to system 100 through second communications interface 120 and second back-end system 130 may send the second selection data to system 100 through first communications interface 115.

After system 100 may receive the second selection data from second front-end system 145 or second back-end system 130 at stage 220, exemplary method 200 may then advance to stage 230 where system 100 may transmit, in response to the first selection data, a first version of first service module 175 to first front-end system 140. The first version of first service module 175 may be associated with a selected application that may be selected from a plurality of applications based on the first selection data. For example, the first selection data may indicate the application corresponding to first software package 160, which may be included in memory 105 along with second software package 165 and third software package 170. With first software package 160 selected, the first version of first service module 175 may be transmitted to first front-end device 140 through second communications interface 120.

Once system 100 may transmit in response to the first selection data, the first version of first service module 175 to first front-end system 140 in stage 230, exemplary method 200 may proceed to stage 240 where system 100 may transmit, in response to the second selection data, a second version of first service module 175 to second front-end system 145. For example, the second version of first service module 175 may be associated with a selected application that may be selected from a plurality of applications based on the second selection data. For example, the second selection data may indicate the application corresponding to first software package 160, which may be included in memory 105 along with second software package 165 and third software package 170. With first software package 160 selected, the second version of first service module 175 may be transmitted to second front-end device 145 through second communications interface 120.

Furthermore, the first version of first service module 175 and the second version of first service module 175 may provide substantially identical processing capabilities. For example, both the first and second versions of first service module 175 may provide an order processing application for first front-end system 140 and second front-end system 145 respectively. However, the first version of first service module 175 may be tailored to the user enterprise operating first front-end system 140. Similarly, the second version of first service module 175 may be tailored to the user enterprise operating second front-end system 145. Tailoring may include, but is not limited to, customizing software for a particular user enterprise without departing substantially from the software's intended purpose or application.

From stage 240, where system 100 may transmit, in response to the second selection data, the second version of first service module 175 to second front-end system 145, exemplary method 200 may continue to stage 250 where system 100 may receive a first output data and a second output data from first front-end system 140 and from second front-end system 145, respectively. For example, the first output data may be produced by the first version of first service module 175 executed on first front-end system 140. Similarly, the second output data may be produced by the second version of first service module 175 executed on second front-end system 145. For example, if software package 160 comprises an order processing application, the first output data and the second output data may comprise orders taken by operators of first front-end device 140 and second front-end device 145 respectively.

After system 100 may receive the first output data and the second output data from first front-end system 140 and from second front-end system 145, respectively, at stage 250, exemplary method 200 may then advance to stage 260 where system 100 may transmit the first output data and the second output data to first back-end system 125 and second back-end system 130 respectively. For example, system 100 may send the first output data and the second output data to first back-end system 125 and second back-end system 130 through first communications interface 115. Moreover, the first selection data and the first output data may not be accessible from second front-end system 145 and second back-end system 130. Similarly, the second selection data and the second output data may not be accessible from first front-end system 140 and first back-end system 125. For example, while different user enterprises operating the plurality of front-end device may desire to use application provided by system 100, they may not wish data associated with the applications' use to be known outside the particular user enterprise.

Once system 100 may transmit the first output data and the second output data to first back-end system 125 and second back-end system 130 respectively in stage 260, exemplary method 200 may proceed to stage 270 where system 100 may process the first output data using a first version of second service module 180 and process the second output data using a second version of second service module 180. For example, second service module 180 may be associated with an order processing application. Furthermore, the first output data and the second output data may include orders taken by respective sales people operating first front-end system 140 and second front-end system 145, respectively. In this case, system 100 may process the first output data using the first version of second service module 180 by accumulating, for example, past order data with current order data included in the first output data. Similarly, system 100 may process the second output data using the second version of second service module 180 by accumulating, for example, past order data with current order data included in the second output data.

The first version of second service module 180 and the second version of second service module 180 may provide substantially identical processing capabilities. For example, both the first and second versions of second service module 180 may be associated with an order processing application for first front-end system 140 and second front-end system 145, respectively. However, the first version of second service module 180 may be tailored to the user enterprise operating first front-end system 140. Similarly, the second version of second service module 180 may be tailored to the user enterprise operating second front-end system 145. Tailoring may include, but is not limited to, customizing software for a particular enterprise without departing substantially from the software's intended purpose or application. From stage 270 where system 100 may process the first output data using the first version of second service module 180 and process the second output data using the second version of second service module 180, exemplary method 200 ends at stage 280.

As an additional feature, system 100 may provide billing data to a wireless service provider. The wireless service provider may provide, for example, wireless communications between second communications interface 120 and the plurality of front-end devices. The billing data may allow the wireless service provider to bill user enterprises associated with, for example, first front-end system 140 or second front-end system 145 for services associated with the application. For example, an operator of system 100 may charge a fee for providing an application to first front-end system 140 or second front-end system 145. However, the operator of system 100 may not have a billing infrastructure in place. The wireless service provider, by virtue of providing wireless service to first front-end system 140 and second front-end system 145, may already have a billing infrastructure in place. Accordingly, the operator of system 100 may provide billing data to the wireless service provider. The wireless service provider may in turn use this billing data in providing a bill to the user enterprises operating first front-end system 140 and seconds front-end system 145 respectively. The wireless service provider may forward fees received corresponding to the billing data to the operator of system 100 minus a collection fee, for example.

Figure 3:
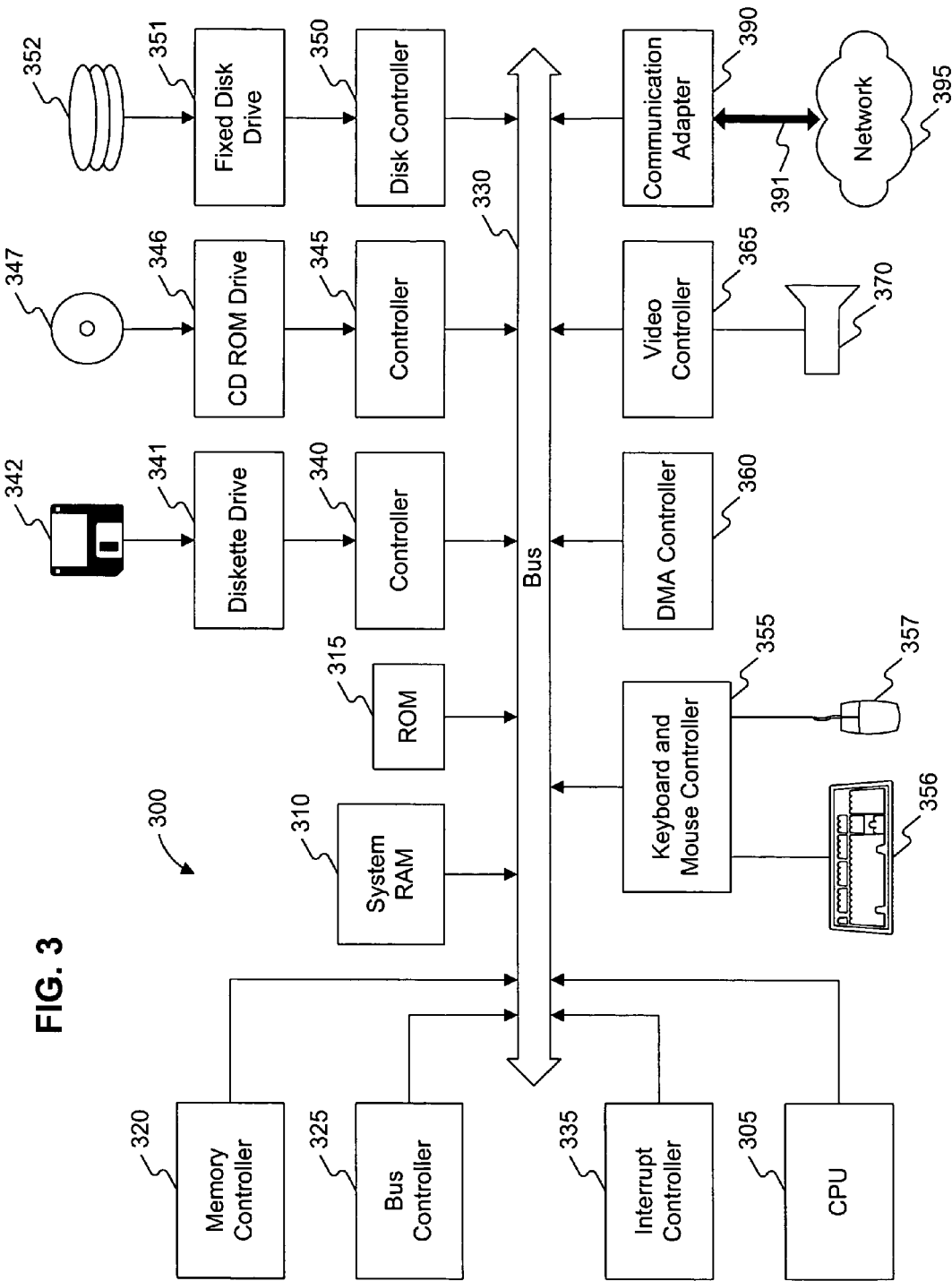
FIG. 3 is a functional block diagram of an exemplary computer system consistent with the present invention.

As herein embodied and illustrated in FIG. 3 is a diagram of a system architecture for computer system 300 with which the invention may be implemented. Consistent with an exemplary embodiment of the present invention, the aforementioned application providing system 100, back-end systems, and front-end systems may comprise, be disposed, or implemented within computer system 300. Although the description may refer to terms commonly used in describing particular computer systems, such as a personal computer, the description and concepts equally apply to other computer systems, such as network computers, workstations, and even mainframe computers having architectures dissimilar to FIG. 3.

Computer system 300 includes a central processing unit (CPU) 305, which may be implemented with a conventional microprocessor, a random access memory (RAM) 310 for temporary storage of information, and a read only memory (ROM) 315 for permanent storage of information. A memory controller 320 controls the RAM 310. With respect to system 100, processing unit 110 may comprise CPU 305 and memory 105 may comprise RAM 310.

A bus 330 interconnects the components of computer system 300. A bus controller 325 controls the bus 330. An interrupt controller 335 receives and processes various interrupt signals from the system components.

Mass storage may be provided by diskette 342, CD ROM 347, or hard drive 352. Data and software may be exchanged with computer system 300 via removable media such as diskette 342 and CD ROM 347. Diskette 342 inserts into diskette drive 341 which, in turn, connects to bus 330 via a controller 340. Similarly, CD ROM 347 inserts into CD ROM drive 346 which, in turn, connects to bus 330 via controller 345. Fixed disk 352 is part of a fixed disk drive 351 that connects to bus 330 by controller 350.

User input to computer system 300 may be provided by a number of devices. For example, a keyboard 356 and mouse 357 connect to bus 330 via controller 355. In addition, other input devices, such as a pen, a tablet, or speech recognition mechanisms, may connect to bus 330 and an appropriate controller and software. A direct memory access (DMA) controller 360 performs direct memory access to RAM 310. User output may be generated by a video controller 365 that controls video display 370.

Computer system 300 also includes a communications adaptor 390 that allows the system to be interconnected to additional computing resources via a local area network (LAN) or a wide area network (WAN), such as the Internet, schematically illustrated by bus 391 and network 395. With respect to system 100, first communications interface 115 and/or second communications interface 120 may comprise communications adaptor 390. Signals traveling through network 395 can generally be referred to as "carrier waves" that transport information. Although aspects of the present invention are described as being stored in memory in the form of instructions, those aspects may be stored on other computer-readable media, such as secondary storage devices like hard disks, floppy disks, or CD ROM, or other forms of RAM or ROM, or a carrier wave.

Operation of computer system 300 is generally controlled and coordinated by operating system software. The operating system controls allocation of system resources and performs tasks, such as memory management, process scheduling, networking, and services, among other things.

While certain features and embodiments of the invention have been described, other embodiments of the invention will be apparent to those skilled in the art from consideration of the specification and practice of the embodiments of the invention disclosed herein. Furthermore, although embodiments of the present invention have been described as being associated with data stored in memory and other storage mediums, one skilled in the art will appreciate that these aspects can also be stored on or read from other types of computer-readable media, such as secondary storage devices, like hard disks, floppy disks, or a CD-ROM, a carrier wave from the Internet, or other forms of RAM or ROM. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A method for providing an application from an application providing system to a first front-end system and a second front-end system, the method comprising:
    receiving a first selection data from a first enterprise having the first front-end system and a first back-end system;
    receiving a second selection data from a second enterprise having the second front-end system and a second back-end system;
    transmitting, in response to the first selection data, a first version of a first service module to the first front-end system, the first version of the first service module being associated with the application and the first enterprise, the application being selected from a plurality of applications based on the first selection data;
    transmitting, in response to the second selection data, a second version of the first service module to the second front-end system, the second version of the first service module being associated with the application and the second enterprise, the application being selected from the plurality of applications based on the second selection data;
    receiving a first output data and a second output data from the first front-end system and from the second front-end system respectively, the first output data being produced by the first version of the first service module executed on the first front-end system and the second output data being produced by the second version of the first service module executed on the second front-end system; and
    transmitting the first output data and the second output data to the first back-end system and the second back-end system respectively, wherein the first selection data and the first output data are not accessible from the second front-end system and the second back-end system, and the second selection data and the second output data are not accessible from the first front-end system and the first back-end system.

2. The method of claim 1, further comprising at least one of processing the first output data using a first version of a second service module associated with the application and processing the second output data using a second version of the second service module associated with the application.

3. The method of claim 2, wherein the first version of the second service module and the second version of the second service module provide substantially identical processing capabilities.

4. The method of claim 1, wherein the first version of the first service module and the second version of the first service module provide substantially identical processing capabilities.

5. The method of claim 1, wherein the first front-end system and the second front-end system each are configured for wireless communications.

6. The method of claim 1, further comprising providing billing data to a wireless service provider, the billing data configured to allow the wireless service provider to bill an enterprise associated with one of the first front-end system and the second front-end system for services associated with the application.

7. A system for providing an application to a first front-end system and a second front-end system, the system comprising:
    a memory storage for maintaining a plurality of data registers; and
    a processing unit coupled to the memory storage, wherein the processing unit is operative to receive a first selection data from a first enterprise having the first front-end system and a first back-end system;

receive a second selection data from a second enterprise having the second front-end system and a second back-end system;

transmit, in response to the first selection data, a first version of a first service module to the first front-end system, the first version of the first service module being associated with the application and the first application, the application being selected from a plurality of applications based on the first selection data;

transmit, in response to the second selection data, a second version of the first service module to the second front-end system, the second version of the first service module being associated with the application and the second application, the application being selected from the plurality of applications based on the second selection data;

receive a first output data and a second output data from the first front-end system and from the second front-end system respectively, the first output data being produced by the first version of the first service module executed on the first front-end system and the second output data being produced by the second version of the first service module executed on the second front-end system; and transmit the first output data and the second output data to the first back-end system and the second back-end system respectively, wherein the first selection data and the first output data are not accessible from the second front-end system and the second back-end system, and the second selection data and the second output data are not accessible from the first front-end system and the first back-end system.

8. The system of claim 7, wherein the processing unit is further operative to at least one of process the first output data using a first version of a second service module associated with the application and process the second output data using a second version of the second service module associated with the application.

9. The system of claim 8, wherein the first version of the second service module and the second version of the second service module provide substantially identical processing capabilities.

10. The system of claim 7, wherein the first version of the first service module and the second version of the first service module provide substantially identical processing capabilities.

11. The system of claim 7, wherein the first front-end system and the second front-end system each are configured for wireless communications.

12. The system of claim 7, wherein the processing unit is further operative to provide billing data to a wireless service provider, the billing data configured to allow the wireless service provider to bill an enterprise associated with one of the first front-end system and the second front-end system for services associated with the application.

13. A non-transitory computer-readable medium which stores a set of instructions which when executed performs a method for providing an application from an application providing system to a first front-end system and a second front-end system, the method executed by the set of instructions comprising:

receiving a first selection data from a first enterprise having the first front-end system and a first back-end system;

receiving a second selection data from a second enterprise having the second front-end system and a second back-end system;

transmitting, in response to the first selection data, a first version of a first service module to the first front-end system, the first version of the first service module being associated with the application and the first enterprise, the application being selected from a plurality of applications based on the first selection data;

transmitting, in response to the second selection data, a second version of the first service module to the second front-end system, the second version of the first service module being associated with the application and the second enterprise, the application being selected from the plurality of applications based on the second selection data;

receiving a first output data and a second output data from the first front-end system and from the second front-end system respectively, the first output data being produced by the first version of the first service module executed on the first front-end system and the second output data being produced by the second version of the first service module executed on the second front-end system; and transmitting the first output data and the second output data to the first back-end system and the second back-end system respectively, wherein the first selection data and the first output data are not accessible from the second front-end system and the second back-end system, and the second selection data and the second output data are not accessible from the first front-end system and the first back-end system.

14. The non-transitory computer-readable medium of claim 13, further comprising at least one of processing the first output data using a first version of a second service module associated with the application and processing the second output data using a second version of the second service module associated with the application.

15. The non-transitory computer-readable medium of claim 14, wherein the first version of the second service module and the second version of the second service module provide substantially identical processing capabilities.

16. The non-transitory computer-readable medium of claim 13, wherein the first version of the first service module and the second version of the first service module provide substantially identical processing capabilities.

17. The non-transitory computer-readable medium of claim 13, wherein the first front-end system and the second front-end system each are configured for wireless communications.

18. The non-transitory computer-readable medium of claim 13, further comprising providing billing data to a wireless service provider, the billing data configured to allow the wireless service provider to bill an enterprise associated with one of the first front-end system and the second front-end system for services associated with the application.

* * * * *